(12) United States Patent
Honma

(10) Patent No.: US 7,864,351 B2
(45) Date of Patent: Jan. 4, 2011

(54) IMAGE FORMING APPARATUS AND METHOD FOR REMOTE JOB EDITING

(75) Inventor: Mikimasa Honma, Miyoshi-machi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1734 days.

(21) Appl. No.: 10/799,683

(22) Filed: Mar. 15, 2004

(65) Prior Publication Data

US 2004/0268352 A1 Dec. 30, 2004

(30) Foreign Application Priority Data

Jun. 30, 2003 (JP) .............................. 2003-186412

(51) Int. Cl.
*G06K 15/02* (2006.01)
*G06F 3/12* (2006.01)
*G06F 15/16* (2006.01)
*H04N 1/21* (2006.01)
*H04N 1/387* (2006.01)

(52) U.S. Cl. ...................... 358/1.15; 358/1.16; 358/453

(58) Field of Classification Search ............... 358/1.9, 358/1.15, 1.16, 1.17, 1.18, 444, 452, 524, 358/537; 718/100
See application file for complete search history.

(56) References Cited

U.S. PATENT DOCUMENTS

| | | | | |
|---|---|---|---|---|
| 5,718,520 | A * | 2/1998 | MacKay ...................... 400/61 |
| 6,289,382 | B1 * | 9/2001 | Bowman-Amuah ......... 709/226 |
| 6,332,163 | B1 * | 12/2001 | Bowman-Amuah ......... 709/231 |
| 6,339,832 | B1 * | 1/2002 | Bowman-Amuah .......... 714/35 |
| 6,434,568 | B1 * | 8/2002 | Bowman-Amuah ................. 1/1 |
| 6,434,628 | B1 * | 8/2002 | Bowman-Amuah .......... 714/48 |
| 6,438,594 | B1 * | 8/2002 | Bowman-Amuah ......... 709/225 |
| 6,442,748 | B1 * | 8/2002 | Bowman-Amuah ......... 717/108 |
| 6,477,580 | B1 * | 11/2002 | Bowman-Amuah ......... 709/231 |
| 6,477,665 | B1 * | 11/2002 | Bowman-Amuah .......... 714/39 |
| 6,496,850 | B1 * | 12/2002 | Bowman-Amuah ......... 709/203 |
| 6,502,213 | B1 * | 12/2002 | Bowman-Amuah .......... 714/49 |
| 6,529,909 | B1 * | 3/2003 | Bowman-Amuah ................. 1/1 |
| 6,529,948 | B1 * | 3/2003 | Bowman-Amuah ......... 709/217 |
| 6,539,396 | B1 * | 3/2003 | Bowman-Amuah ................. 1/1 |
| 6,549,949 | B1 * | 4/2003 | Bowman-Amuah ......... 709/236 |
| 6,550,057 | B1 * | 4/2003 | Bowman-Amuah ......... 717/126 |
| 6,571,282 | B1 * | 5/2003 | Bowman-Amuah ......... 709/219 |
| 6,578,068 | B1 * | 6/2003 | Bowman-Amuah ......... 709/203 |
| 6,601,192 | B1 * | 7/2003 | Bowman-Amuah .......... 714/38 |
| 6,601,234 | B1 * | 7/2003 | Bowman-Amuah ......... 717/108 |
| 6,606,660 | B1 * | 8/2003 | Bowman-Amuah ......... 709/227 |
| 6,615,199 | B1 * | 9/2003 | Bowman-Amuah .......... 706/50 |
| 6,615,253 | B1 * | 9/2003 | Bowman-Amuah ......... 709/219 |

(Continued)

FOREIGN PATENT DOCUMENTS

JP 2000-357072 12/2000

(Continued)

*Primary Examiner*—Scott A Rogers
(74) *Attorney, Agent, or Firm*—Finnegan, Henderson, Farabow, Garrett & Dunner, L.L.P.

(57) ABSTRACT

An image forming apparatus connected to a network, including: an operation section for editing a first job ticket specifying an output condition to output image data onto an output medium; an interface section to communicate a remote operation apparatus through the network; and a control section to allow the remote operation apparatus to edit a second job ticket.

3 Claims, 6 Drawing Sheets

U.S. PATENT DOCUMENTS

| | | | | |
|---|---|---|---|---|
| 6,636,242 B2 * | 10/2003 | Bowman-Amuah | ......... | 715/764 |
| 6,640,238 B1 * | 10/2003 | Bowman-Amuah | ......... | 709/201 |
| 6,640,244 B1 * | 10/2003 | Bowman-Amuah | ......... | 709/207 |
| 6,640,249 B1 * | 10/2003 | Bowman-Amuah | ......... | 709/228 |
| 6,715,145 B1 * | 3/2004 | Bowman-Amuah | ......... | 718/101 |
| 6,742,015 B1 * | 5/2004 | Bowman-Amuah | ......... | 718/101 |
| 6,842,906 B1 * | 1/2005 | Bowman-Amuah | ......... | 719/330 |
| 7,020,697 B1 * | 3/2006 | Goodman et al. | ......... | 709/223 |
| 7,207,069 B2 * | 4/2007 | Foster et al. | ......... | 726/30 |
| 7,249,314 B2 * | 7/2007 | Walker et al. | ......... | 715/205 |
| 7,289,964 B1 * | 10/2007 | Bowman-Amuah | ......... | 705/1.1 |
| 7,349,869 B2 * | 3/2008 | Oakeson et al. | ......... | 705/26 |
| 7,536,128 B2 * | 5/2009 | Haga | ......... | 399/82 |
| 2002/0184240 A1 * | 12/2002 | Volkoff et al. | ......... | 707/200 |
| 2002/0194245 A1 * | 12/2002 | Simpson et al. | ......... | 709/101 |
| 2005/0134876 A1 * | 6/2005 | Honma et al. | ......... | 358/1.9 |
| 2005/0146751 A1 * | 7/2005 | Haga | ......... | 358/1.18 |
| 2009/0046316 A1 * | 2/2009 | Morohashi et al. | ......... | 358/1.15 |
| 2009/0141292 A1 * | 6/2009 | Adams et al. | ......... | 358/1.6 |

FOREIGN PATENT DOCUMENTS

| | | |
|---|---|---|
| JP | 2001-306204 | 11/2001 |
| JP | 2002-281195 | 9/2002 |

* cited by examiner

IMAGE FORMING APPARATUS AND METHOD FOR REMOTE JOB EDITING

BACKGROUND OF THE INVENTION

This invention relates to a copying machine, a printer, a fax machine, and a scanner, or a composite machine of these (hereinafter referred to as an image forming apparatus).

In recent years, it has been known a system to enable remote operation of an image forming apparatus from a remote operation apparatus using a personal computer or the like through a network (refer to the patent literatures 1 to 3 for example).

In such an image forming apparatus, on the basis of various kinds of request for processing inputted from the operational section provided in the image forming apparatus itself or a remote operation apparatus, various kinds of job such as an image formation job is practiced. An image formation job is defined by means of a job control language in an image forming apparatus, and is registered in a job queue. The registered image formation job is practiced in accordance with the priority order such as the order of request for image formation in the image formation job inputted from a remote operation apparatus, for example.

An image formation job contains image data of the object of output and a job ticket specifying the output conditions. A job ticket is data specifying the output conditions of image data, and to be concrete, it specifies whether printing is to be done in duplex or simplex, the selection of paper to be used, the magnification, the number of copies, etc. Until an image formation job is carried out, by the edition of this job ticket, it is possible to change the output conditions of image data.

[Patent Literature 1]
The publication of unexamined patent application 2000-357072.

[Patent Literature 2]
The publication of unexamined patent application 2002-281195.

[Patent Literature 3]
The publication of unexamined patent application 2001-306204.

However, in the above-mentioned conventional system (patent literatures 1 to 3), it has been impossible to edit a job ticket controlled in an image forming apparatus by means of a remote operation apparatus. For this reason, in cases where an output condition is changed, a user has to move to a place where the image forming apparatus is installed to carry out the edition of the job ticket by the operation section provided in the apparatus mainframe; this makes the convenience of use poor. Further, there has been a problem that during the carrying out of an edition of a job ticket, the operation section is occupied by a user, which makes it impossible for another user to operate. On the contrary, when the operation section is occupied by another user, an edition of a job ticket cannot be carried out, which brings about a possibility of a job being practiced with the output conditions unchanged. Further, during the carrying out of an edition operation of a job ticket, it happens also a case, for example, where an image formation operation is temporarily interrupted, which lowers the working efficiency of the image forming apparatus.

It is an object of this invention to provide an image forming apparatus having an improved operational performance.

SUMMARY OF THE INVENTION

The above-mentioned object can be accomplished by an invention having any one of the following features.

(1) An image forming apparatus having a mainframe operation section for editing a job ticket for specifying an output condition in outputting image data on an output medium, characterized by comprising, in addition to said job ticket to be edited by said mainframe operation section, a job ticket capable of edition by means of a remote operation apparatus.

According to the feature (1), the image forming apparatus comprises, in addition to a job ticket to be edited by the mainframe operation section, a job ticket capable of edition by means of a remote operation apparatus; therefore, it is possible for a user to edit a job ticket from a remote operation apparatus without being influenced by the condition of the image forming apparatus such that the mainframe operation section is used by another user, or an image formation operation is being carried out, which makes it possible to improve the operational performance.

(2) An image forming apparatus having a mainframe operation section for editing a job ticket for specifying an output condition in outputting image data on an output medium, characterized by being equipped with a storage section having a job ticket storing area for the mainframe operation section for storing said job ticket to be edited by the mainframe operation section and a job ticket storing area for a remote operation apparatus for storing a job ticket capable of being edited by said remote operation apparatus, and a control section practicing a control, in a case where it receives a request for edition of said job ticket from said remote operation apparatus, in such a way as to write said job ticket having been read out from said job ticket storing area for the mainframe operation section in said job ticket storing area for a remote operation apparatus, and practicing a control, in a case where it receives a request for saving a job ticket from said remote operation apparatus, in such a way as to write a job ticket having been edited by said remote operation apparatus in said job ticket storing area for the mainframe operation section from said job ticket storing area for a remote operation apparatus.

(2) According to the feature (2), in a case where the image forming apparatus receives a request for edition of a job ticket from a remote operation apparatus, it writes a job ticket having been read out from the job ticket storing area for the mainframe operation section in the job ticket storing area for a remote operation apparatus, and the remote operation apparatus edits the job ticket written in the job ticket storing area for a remote operation apparatus; therefore, it is possible for a user to edit a job ticket from a remote operation apparatus without being influenced by the condition of the image forming apparatus such that the mainframe operation section is being used by another user, the mainframe operation section is carrying out an edition of a job ticket stored in the job ticket storing area for the mainframe operation section, or an image formation operation is being carried out, which makes it possible to improve the operational performance.

(3) An image forming apparatus having a feature as set forth in the feature (2), characterized by the aforesaid job ticket stored in the aforesaid job ticket storing area for a remote operation apparatus being capable of being edited only by said remote operation apparatus.

According to the feature (3), a job ticket stored in the job ticket storing area for a remote operation apparatus can be edited only by a remote operation apparatus; therefore, it never happens that the remote operation apparatus competes with the mainframe operation section in an edition operation.

(4) An image forming apparatus having a feature as set forth in any one of the features (1) to (3), characterized by it that the data format of the aforesaid job ticket to be edited by the aforesaid mainframe operation section is the same as that of the aforesaid job ticket capable of being edited by a remote operation apparatus.

According to the feature (4), the data format is the same for both the job tickets; therefore, as occasion demands, it is possible to duplicate a job ticket to be edited by the mainframe operation section to make a job ticket capable of being edited by a remote operation apparatus, or to substitute a job ticket having been edited by a remote operation apparatus for a job ticket to be edited by the mainframe operation section.

(5) An image forming apparatus connected for communication with a plurality of remote operation apparatus for editing a job ticket specifying an output condition in outputting image data on an output medium, characterized by being equipped with a storage section having a plurality of job ticket storing areas for storing a job ticket capable of being edited by a remote operation apparatus, and a control section for writing, in a case where it receives a request for edition of a job ticket from one of said plural remote operation apparatus, the job ticket to be subjected to the edition in one of said plural job ticket storing areas, to make it possible for the remote operation apparatus to exclusively carry out the edition of said job ticket.

According to the feature (5), it is possible to carry out edition of job tickets by a plurality of remote operation apparatus, which improves the operational performance. Further, it is possible to write a job ticket to be subjected to edition in one of the job ticket storing areas for one of the plural remote operation apparatus, to make this job ticket capable of being edited only by said one of the plural remote operation apparatus.

(6) An image forming apparatus having a feature as set forth in the feature (5), characterized by the aforesaid control section transmitting, in a case where it receives a request for edition of a job ticket from one of the aforesaid plural remote operation apparatus, identification information for identifying the job ticket to be subjected to the edition to said one of the plural remote operation apparatus.

According to the feature (6), the image forming apparatus transmits identification information for identifying a job ticket to be subjected to edition to one of the plural remote operation apparatus having transmitted a request for edition; therefore, it is possible for the image forming apparatus to identify which job ticket is to be edited by which remote operation apparatus.

(7) An image forming apparatus having a feature as set forth in the feature (5) or (6), characterized by the aforesaid control section notifying said remote operation apparatus that the edition of a job ticket is impossible, in a case where all of the aforesaid plural job ticket storing areas are filled with a job ticket written each when it receives a request for edition from one of the aforesaid plural remote operation apparatus.

According to the feature (7), in a case where edition of a job ticket is impossible, a remote operation apparatus concerned is notified of that; therefore, a user can find whether or not edition of a job ticket is possible.

(8) An image forming method including the steps of: editing a job ticket for specifying an output condition in outputting image data onto an output medium by using a mainframe operation section equipped in a mainframe of an image forming apparatus; editing the other job ticket than the job ticket to be edited by the mainframe operation section, by using a remote operation apparatus; and outputting the image data onto the output medium by applying the job ticket edited by using the mainframe operation section and/or by applying the other job ticket edited by using the remote operation apparatus.

According to the feature (8), it is possible for a user to edit a job ticket from a remote operation apparatus without being influenced by the condition of the image forming apparatus such that the mainframe operation section is used by another user, or an image formation operation is being carried out, which makes it possible to improve the operational performance.

(9) The image forming method having a feature as set forth in the feature (8), further including the steps of: storing a job ticket being edited by the mainframe operation section into a first job ticket storing area for the mainframe operation section; storing a job ticket capable of being edited by the remote operation apparatus into a second job ticket storing area for the remote operation apparatus; controlling, when a request for edition of a job ticket is received from the remote operation apparatus, in such a way as to write the job ticket read out from the first job ticket storing area into the second job ticket storing area; and controlling, when a request for saving a job ticket is received from the remote operation apparatus, in such a way as to read the job ticket edited by the remote operation apparatus from the second job ticket storing area, and to write into the first job ticket storing area.

According to the feature (9), it is possible for a user to edit a job ticket from a remote operation apparatus without being influenced by the condition of the image forming apparatus such that the mainframe operation section is being used by another user, the mainframe operation section is carrying out an edition of a job ticket stored in the job ticket storing area for the mainframe operation section, or an image formation operation is being carried out, which makes it possible to improve the operational performance.

(10) An image forming method for forming an image by using an apparatus connected for communication with a plurality of remote operation apparatus for editing a job ticket specifying an output condition in outputting image data on an output medium, the image forming method including the steps of: storing a job ticket capable of being edited by a remote operation apparatus in a storage section having a plurality of job ticket storing areas for, and controlling to write, when a control section receives a request for editing the job ticket from one of the plurality of remote operation apparatus, the job ticket being subjected to the edition into one of the plurality of job ticket storing areas, to make it possible for the remote operation apparatus to exclusively conduct the edition of the job ticket.

According to the feature (10), it is possible to carry out edition of job tickets by a plurality of remote operation apparatus, which improves the operational performance. Further, it is possible to write a job ticket to be subjected to edition in one of the job ticket storing areas for one of the plural remote operation apparatus, to make this job ticket capable of being edited only by said one of the plural remote operation apparatus.

DETAILED DESCRIPTION OF THE PREFERRED EMBODIMENT

In the following, the first embodiment and the second embodiment of this invention will be explained with reference to the drawings.

First Embodiment

Figure 1:
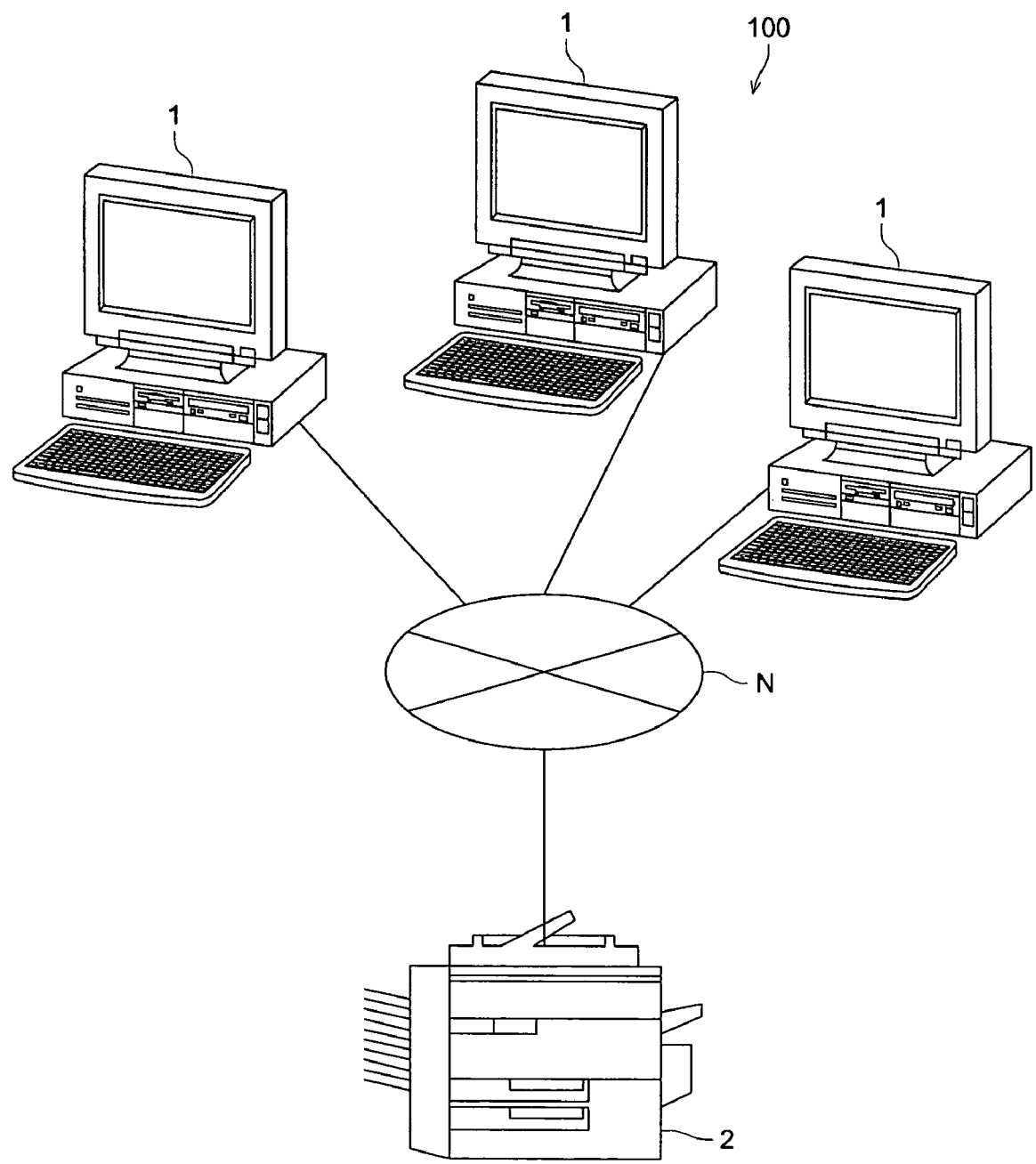
FIG. 1 is a drawing showing the structure of an image forming system 100 of the embodiment of this invention.

In FIG. 1, the structure of an image forming system 100 including an image forming apparatus of the first embodiment is shown. As shown in FIG. 1, the image forming system 100 has a plurality of remote operation apparatus 1 and an image forming apparatus 2, and these are connected for communication with one another through a network N. The image forming apparatus 2 receives an operation instruction containing a request for edition of a job ticket from one of the remote operation apparatus 1, and is subjected to remote operation by this.

As described above, a job ticket is data specifying output conditions in outputting image data such as whether the printing is to be done in duplex or in simplex, the selection of paper to be used, the magnification, and the number of copies, and is data indicating an operational instruction in practicing a job. The image forming apparatus 2 of this invention makes it possible to edit a job ticket controlled in the image forming apparatus 2 from the remote operation apparatus 1, and makes it possible for the remote operation apparatus 1 to change the output conditions of image data.

First, the structure of the remote operation apparatus 1 will be explained.

Figure 2:
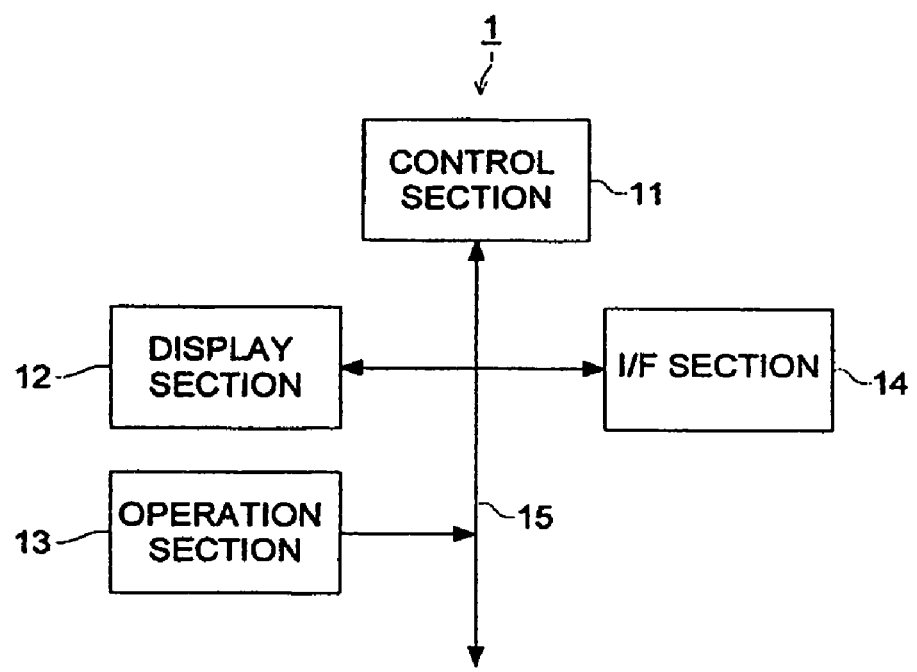
FIG. 2 is a block diagram showing the internal structure of the remote operation apparatus 1 shown in FIG. 1.

The remote operation apparatus 1 is, for example, a personal computer, and as shown in FIG. 2, is equipped with a control section 11, a display section 12, an operation section 13, an I/F section 14, etc.; all the sections are connected with one another through a bus 15.

The control section 11 is equipped with a CPU (Central Processing Unit), a RAM (Random Access Memory), a ROM (Read Only Memory), etc., and the CPU carries out a centralized control for the overall operation of the remote operation apparatus, by transmitting control signals to the above-mentioned sections in accordance with various kinds of control program stored in the ROM, using a specified area of the RAM as a work area.

The display section 12 carries out various kinds of display on the basis of control signals inputted from the control section 11, and an operation screen for remotely operating the image forming apparatus 2 is displayed thereon. Further, as will be described later, by communication with the image forming apparatus 2, it acquires various bits of mainframe information such as the function which the image forming apparatus 2 has and the condition of the machine, and displays the mainframe information.

The operation section 13 is made up of components including a keyboard made up of numeral keys, character keys, various kinds of function key, etc. for inputting the certification information of a user and an operational instruction for the image forming apparatus 2 and a pointing device such as a mouse.

By operating the operation section 13 on the basis of a operation screen displayed on the display section 12, a user can input various kinds of operational instruction for the image forming apparatus 2, to carry out the transmission of operational instruction data, etc.

The I/F section 14 is an interface for making communication connection with the image forming apparatus 2, through which give-and-receive of data is carried out between the remote operation apparatus 1 and the image forming apparatus 2.

Next, the structure of the image forming apparatus will be explained.

Figure 3:
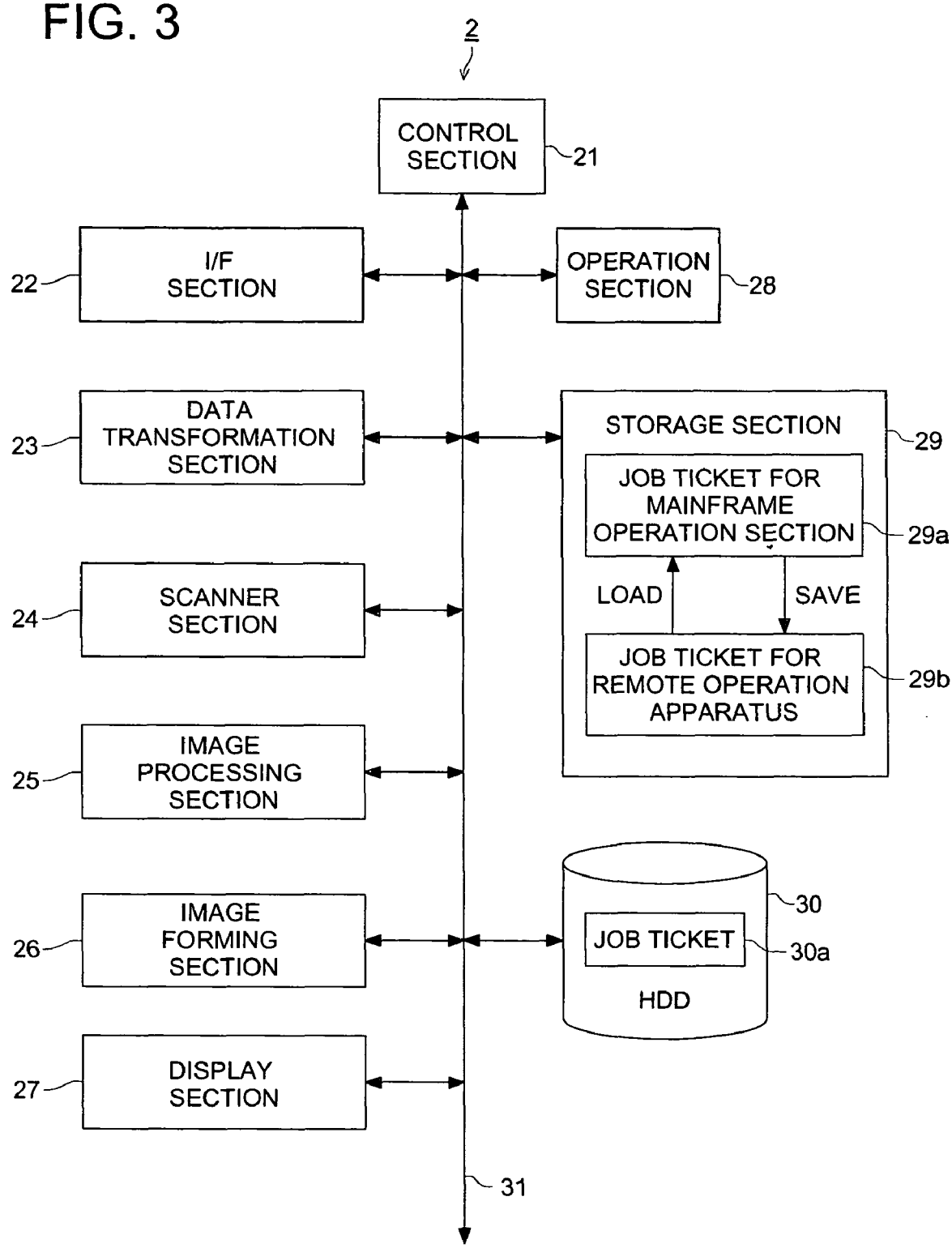
FIG. 3 is a block diagram showing the internal structure of the image forming apparatus 2 shown in FIG. 1.

The image forming apparatus 2 is, for example, a copying machine, a printer, a fax machine, a scanner, or a composite machine of these, and as shown in FIG. 3, is equipped with a control section 21, an I/F section 22, a data transforming section 23, a scanner section 24, an image processing section 25, an image forming section 26, a display section 27, an operation section 28, a storage section 29, and an external storage device 30; all of these sections are connected with one another through a bus 31.

The I/F section 22 is an interface for making communication connection with the remote operation apparatus 1, through which give-and-receive of data is carried out between the remote operation apparatus 1 and the image forming apparatus 2.

The data transformation section 23 transforms data to be given and received between the remote operation apparatus 1 and the image forming apparatus 2 through the I/F section 22 into data of a format capable of being processed by each of the apparatus 1 and 2. For example, operational instruction data transmitted from any one of the remote operation apparatus 1 are transformed into data of a format capable of being processed by the image forming section 26 in said data transforming section 23.

The scanner section 24 has a light source, a CCD image sensor, a drive circuit, etc. provided under a contact glass plate (none of these is shown in the drawing), and acquires image data from an original document placed on the contact glass plate.

The image processing section 25 applies image processing to image data having been inputted through any one of the remote operation apparatus 1 or the scanner section 24 as occasion demands. For the image processing to be applied to image data, for example, compression coding or expansion decoding, enlargement or reduction processing of an image, rotation processing of an image, etc. can be cited.

The image forming section 26 practices, on the basis of image data to which signal processing has been applied in the image processing section 25, an image formation operation for forming an image on a recording medium such as a paper sheet by an electrophotography method, an ink jet method, or the like.

The display section 27 is made up of an LCD (Liquid Crystal Display) etc., and displays an operation screen displaying various kinds of operation buttons and other various kinds of display information, on the basis of a control signal transmitted from the control section 21.

The operation section 28 is made up of a touch panel formed as a unified body with the display section 27, numeral keys for inputting certification information, character keys, various kinds of function key, etc., and outputs a depress signal corresponding to the key depressed to the control section 21.

The storage section 29 is made up, for example, of a rewritable storage device such as a RAM, and comprises a job ticket storing area for the mainframe operation section 29a and a job ticket storing area for a remote operation apparatus 29b.

In the job ticket storing area for the mainframe operation section 29*a*, a job ticket of an image formation job registered in a job queue is stored. In the case where an edition operation of a job ticket is carried out from the operation section 28, a job ticket stored in this job ticket storing area for the mainframe operation section 29*a* is edited.

In the job ticket storing area for a remote operation apparatus 29*b*, a job ticket capable of being edited by any one of the remote operation apparatus 1 is stored. In addition, only it is necessary for the storage section 29 to comprise at least one job ticket storing area 29*b*, and the number of the job ticket storing areas for a remote operation apparatus is not to be particularly limited.

In the case where an edition operation of a job ticket is carried out from one of the remote operation apparatus 1, a job ticket stored in this job ticket storing area for a remote operation apparatus 29*b* (hereinafter referred to as "a job ticket for a remote operation apparatus") is edited. In addition, a job ticket for a remote operation apparatus can be edited only by the remote operation apparatus 1, and it is impossible for the operation section 28 (hereinafter sometimes referred to as "the mainframe operation section") to carry out an edition of a job ticket for a remote operation apparatus.

A job ticket for a remote operation apparatus is such that a job ticket read out from the job ticket storing area for the mainframe operation section 29*a* (hereinafter referred to as "a job ticket for the mainframe operation section") in response to a request for a job ticket edition from one of the remote operation apparatus 1 is written in the job ticket storing area for a remote operation apparatus 29*b*. That is, a job ticket for a remote operation apparatus is a duplicate of a job ticket for the mainframe operation section, and both have the same data format.

The external storage device 30 is, for example, a hard disk (HDD), or may be a CD-RW (CD-ReWritable), a DVD-RAM, or the like which is provided to be capable of being mounted and dismounted. Further, it may be a storage device that is connected with the image forming apparatus through a communication network, for example, a storage device provided in a PC or the like. In the external storage device 30, there is provided a job ticket storing area 30*a*. A job ticket stored in said job ticket storing area 30*a* is read out and used as occasion demands. For example, by writing a job ticket having been read out from said job ticket storing area 30*a* in the job ticket storing area for a remote operation apparatus 29*b*, it is possible to carry out an edition of a job ticket by the remote operation apparatus 1. By writing the job ticket after edition again in the job ticket storing area 30*a*, it is possible to save the edited job ticket.

The control section 21 is equipped with a CPU, a RAM, a ROM, etc., and the CPU makes a centralized control for the overall operation of the image forming apparatus 2, by transmitting control signals to the above-mentioned sections in accordance with various kinds of control program stored in the ROM, the external storage device 30, etc., using a specified area of the RAM as a work area. In addition, it is also appropriate that a part of the storage area in the RAM is the storage section 29 comprising the above-mentioned job ticket storing areas 29*a* and 29*b*.

The control section 21, having received a request for edition of a job ticket from the remote operation apparatus 1 through the communication network N, carries out the operation to be explained below.

Figure 4:
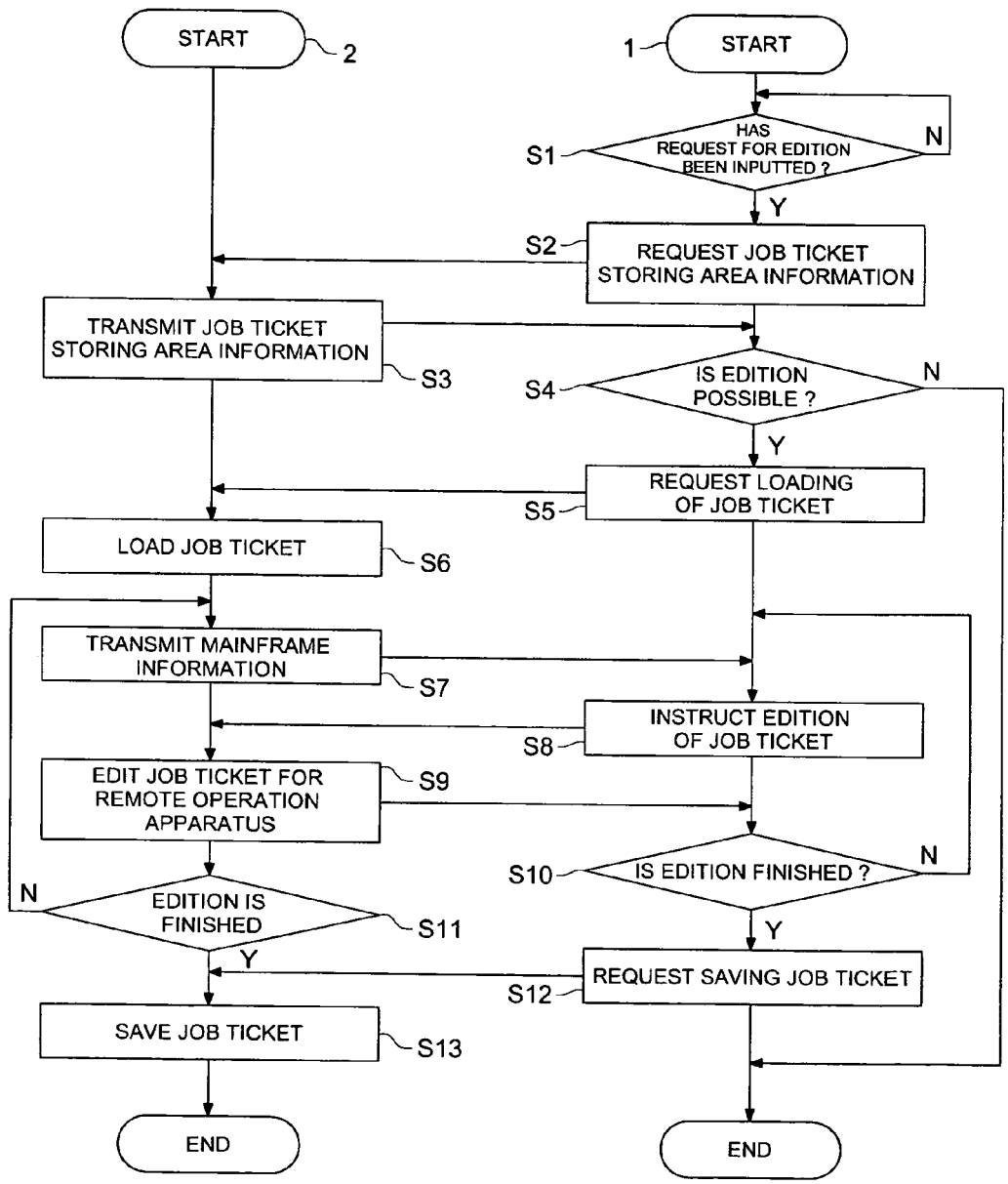
FIG. 4 is a flow chart showing the operation to be practiced in the first embodiment of this invention.

FIG. 4 is a flow chart showing the operation in the first embodiment.

If a request for edition of a job ticket has been inputted through the operation section 13 (step S1: Y), first, between the remote operation apparatus 1 and the image forming apparatus 2, information on whether or not there is the job ticket storing area for a remote operation apparatus 29*b* having no job ticket written in the storage section 29 of the image forming apparatus 2 is given and received (step S2 and S3), and on the basis of it, it is judged whether or not edition of a job ticket by the remote operation apparatus 1 is possible (step S4).

If edition of a job ticket is possible (step S4: Y), a request for loading of a job ticket is transmitted from the remote operation apparatus 1 to the image forming apparatus 2 to make the latter read out a job ticket to be subjected to the edition from the job ticket storing area for the mainframe operation section 29*a* and write it in the job ticket storing area for a remote operation apparatus 29*b* (step S5). Besides, if edition of a job ticket is impossible (step S4: N), the processing is completed.

When the image forming apparatus 1 has received a request for loading a job ticket, it reads out a job ticket to be subjected to the edition from the job ticket storing area for the mainframe operation section 29*a*, and writes it in the job ticket storing area for a remote operation apparatus 29*b* (step S6).

Next, mainframe information is transmitted from the image forming apparatus 2 to the remote operation apparatus 1 (step S7). Mainframe information, as described in the foregoing, indicates the function which the image forming apparatus 2 has, the condition of the machine, etc., and indicates, for example, whether or not duplex/simplex printing is possible, the kind/size of selectable paper sheet, the selectable magnification, the upper limit of the number of copies which can be outputted, etc.

The remote operation apparatus 1 transmits, on the basis of the mainframe information transmitted thereto, an instruction of edition of a job ticket to the image forming apparatus 2 (step S8). The image forming apparatus 2 carries out the edition of the job ticket for a remote operation apparatus on the basis of the instruction of edition received, and transmits the result of the edition to the remote operation apparatus 1 (step S9). Until the edition operation of the job ticket is finished (step S10: Y, step S11: Y), the operation from the step S7 to the step S11 is repeated; thus, the edition of the job ticket for a remote operation apparatus is carried out.

Next, when a request for saving a job ticket has been transmitted from the remote operation apparatus 1 to the image forming apparatus 2 (step S12), the image forming apparatus 2 writes the job ticket after edition in the job ticket storing area for the mainframe operation section 29*a*, to save the job ticket (step S13).

At this time, it is also appropriate for the image forming apparatus 2 to save the job ticket by substituting it for the job ticket for the mainframe operation section which was read out from the job ticket storing area for the mainframe operation section 29*a* in the step S5, or also it is possible to save it newly in a case or the like where another user is carrying out an edition of the job ticket concerned through the operation section 28; it is appropriate to select one of the above-mentioned saving methods as occasion demands. It is also appropriate that, simultaneously with this, the job ticket for a remote operation apparatus is erased from the job ticket storing area for a remote operation apparatus 29*b*; this makes it ready for the next case where a request for edition of a job ticket is transmitted from some one of the remote operation apparatus 1.

By this embodiment of the invention, it is possible to carry out edition of a job ticket by any one of the remote operation apparatus 1, which improves the operational performance. At this time, the remote operation apparatus 1 does not edit a job ticket for the mainframe operation section to be edited by the mainframe operation section 28, but edits a job ticket for a remote operation apparatus stored in the job ticket storing area for a remote operation apparatus 29b; therefore, even if another edition operation of a job ticket which is the object of the edition is being carried out in the mainframe operation section 28, it is possible to edit the job ticket by the remote operation apparatus 1 without competing with it. Further, because it never happens that the operation section 28 is occupied by one user for the purpose of edition of a job ticket, it is possible to make the image forming apparatus 2 carry out continuously image formation operation, which makes it possible to raise the working efficiency of the image forming apparatus 2.

Further, in this embodiment, accompanied by the start of communication between the image forming apparatus 2 and the remote operation apparatus 1, information on whether or not the job ticket storing area for a remote operation apparatus 29b is filled with a job ticket written is given and received, and it is judged on the basis of this whether or not edition of a job ticket is possible (step S3); therefore, it is possible for the remote operation apparatus 1 which is supposed to carry out the edition of a job ticket to edit the job ticket without competing with other remote operation apparatus.

Further, in this embodiment, every time a job ticket for a remote operation apparatus is edited, mainframe information is transmitted to the remote operation apparatus 1 concerned; therefore, when a job ticket is edited, in a case or the like where there is no paper of the kind/size to be selected due to, for example, the running out of the paper, as the present condition of the image forming apparatus 2 can be displayed on the display section 12 on the basis of the mainframe information, it never happens that a job ticket is edited to have a content which cannot be set, for example, in a manner such that a function which the image forming apparatus 2 does not have is selected by a user.

Further, as occasion demands, it is possible to write a job ticket stored in the external storage device 30 in the job ticket storing area for a remote operation apparatus 29b; therefore, it becomes possible to edit such a job ticket stored in the external storage device 30 from a remote operation apparatus, which makes it possible to further improve the operational performance.

Second Embodiment

Next, with reference to FIG. 5 and FIG. 6, the second embodiment of this invention will be explained. The second embodiment will be explained with it taken for instance a control in the case where, in an image forming apparatus 3 having a plurality of job ticket storing areas for a remote operation apparatus 33a to 33c (refer to FIG. 5), a request for edition of a job ticket is transmitted from any one of a plurality of remote operation apparatus 1. In addition, to the same structural components as the first embodiment, the same signs are attached respectively, and the explanation will be omitted.

Because the structure of each of the remote operation apparatus 1 is approximately the same as that of the first embodiment, the explanation will be omitted, and the structure of the image forming apparatus 3 of the second embodiment will be explained.

Figure 5:
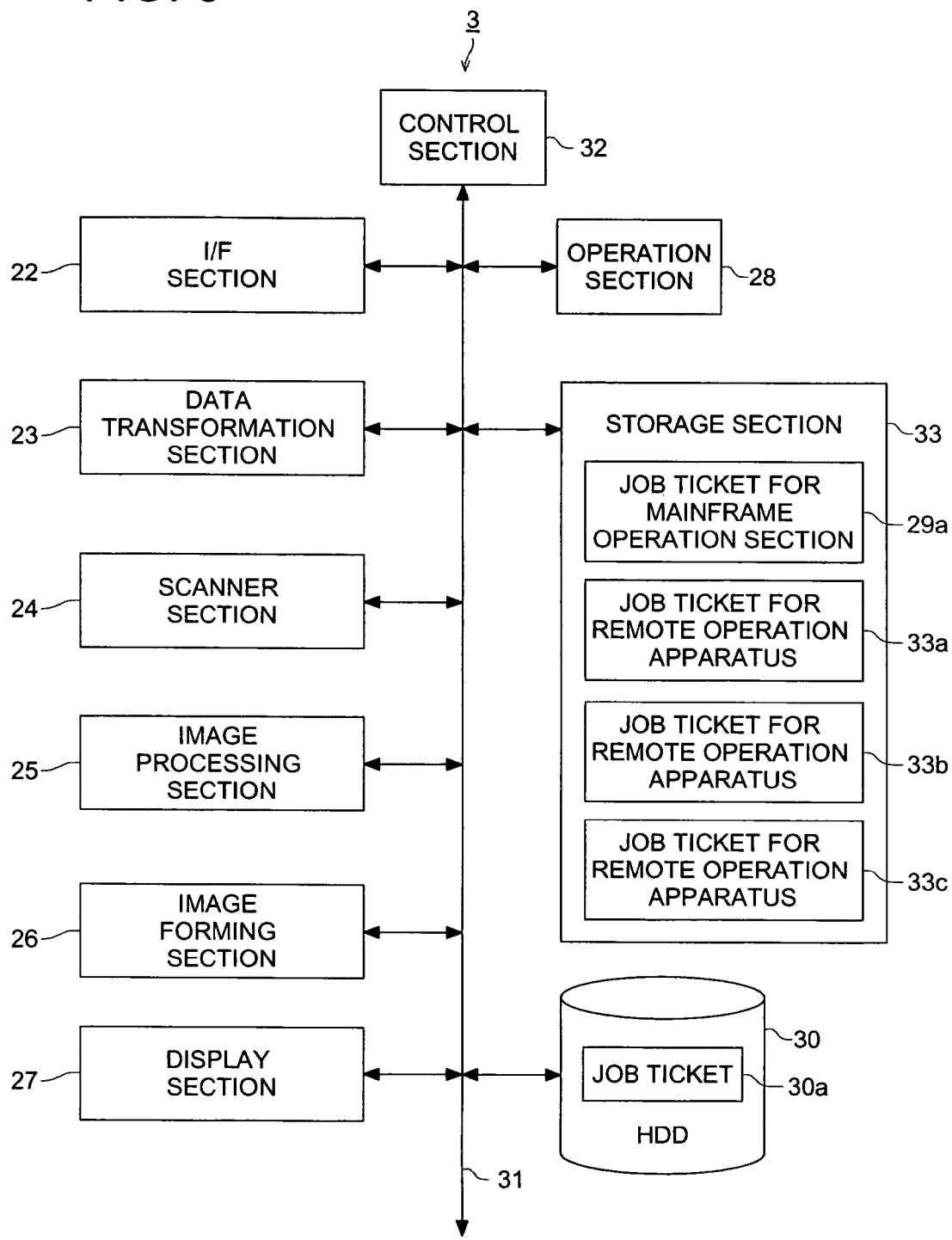
FIG. 5 is a block diagram showing the internal structure of an image forming apparatus 3 of the second embodiment of this invention.

As shown in FIG. 5, the image forming apparatus 3 of the second embodiment comprises a control section 32, an I/F section 22, a data transforming section 23, a scanner section 24, an image processing section 25, an image forming section 26, a display section 27, an operation section 28, a storage section 33, and an external storage device 30 such as an HDD. The sections having a structure different from that in the first embodiment are the control section 32 and the storage section 33.

First, the storage section 33 will be explained.

The storage section 33 is made up of a rewritable storage device such as a RAM in the same manner as that of the first embodiment, and comprises a plurality of job ticket storing areas for a remote operation apparatus 33a to 33c, on top of the job ticket storing area for the mainframe operation section 29a. It is possible to store a job ticket for a remote operation apparatus in each of the job ticket storing areas for a remote operation apparatus 33a to 33c. In addition, it is enough if only there are a plurality of these job ticket storing areas for a remote operation apparatus 33a to 33c, and the number of them is not particularly limited.

Further, in the same manner as the first embodiment, it is possible to write a job ticket which is stored in the job ticket storing area 30a of the external storage device 30 in any one of the job ticket storing areas for a remote operation apparatus 33a to 33c. By this, it is possible to edit a job ticket stored in the external storage device 30 by means of any one of the remote operation apparatus 1.

The control section 32 is equipped with a CPU, a RAM, a ROM, etc., and the CPU makes a centralized control for the overall operation of the image forming apparatus 3, by transmitting a control signal to each of the sections in accordance with various kinds of control program stored in the ROM, the external storage device 30, etc., using a specified area of the RAM as the work area. In addition, it is also appropriate that a part of the storage area in the RAM is the above-mentioned storage section 33 comprising the above-mentioned job ticket storing areas 29a, and 33a to 33c.

The control section 32, having received a request for edition of a job ticket from any one of the remote operation apparatus 1 through the communication network N, carries out the operation to be explained below.

Figure 6:
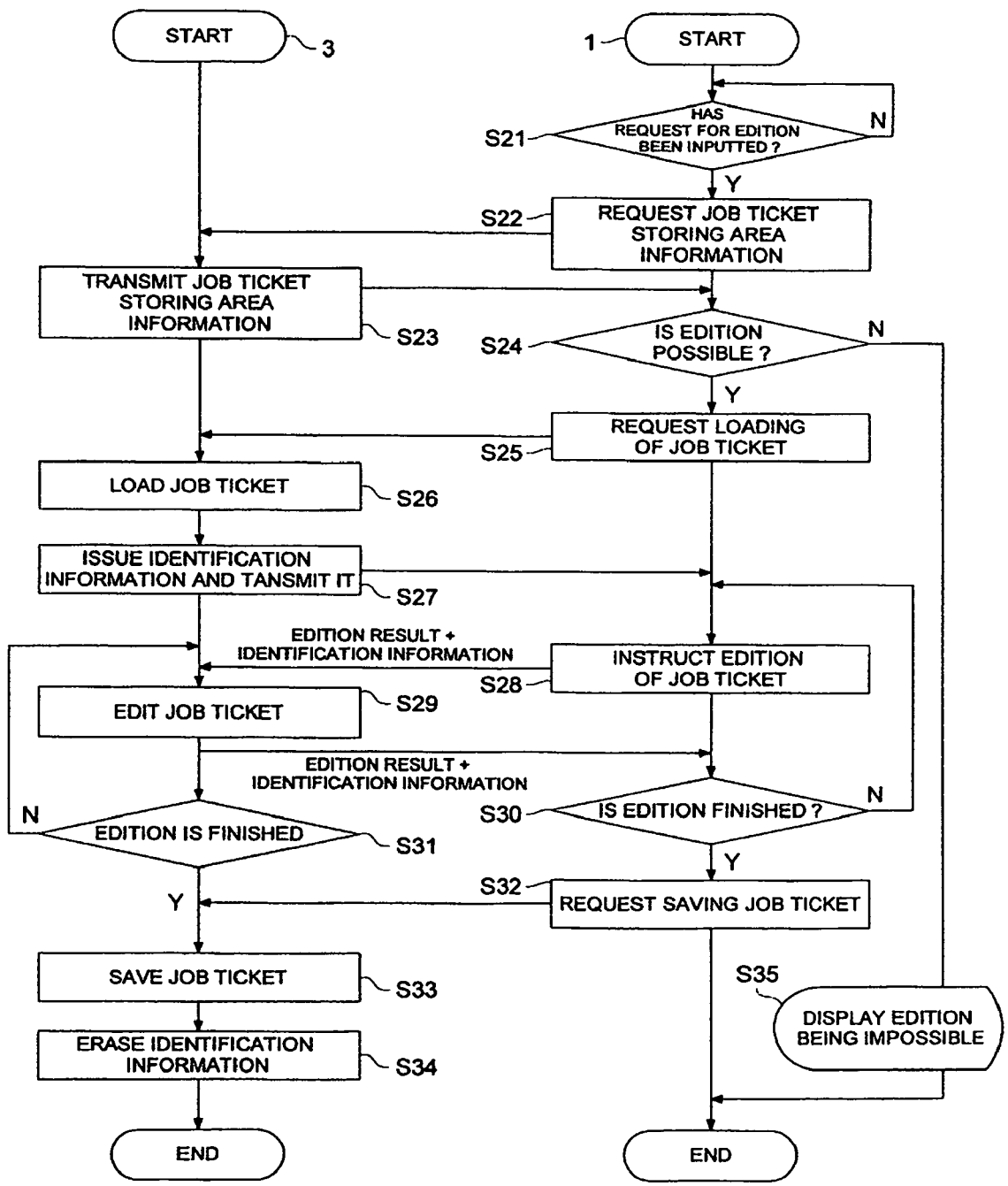
FIG. 6 is a flow chart showing the operation to be practiced in the second embodiment.

FIG. 6 is a flow chart showing the operation in the second embodiment of this invention.

If a request for edition of a job ticket has been inputted from one of the remote operation apparatus 1 through the operation section 13 (step S21: Y), first, between the remote operation apparatus 1 and the image forming apparatus 3, information on whether or not there is an area having no job ticket written among the job ticket storing areas for a remote operation apparatus 33a to 33c is given and received (steps S22 and S23), and on the basis of it, it is judged whether or not an edition of a job ticket by the remote operation apparatus 1 is possible (step S24).

If edition of a job ticket is possible (step S24: Y), a request for loading of a job ticket is transmitted from the remote operation apparatus 1 to the image forming apparatus 3 to make the latter read out a job ticket to be subjected to the edition from the job ticket storing area for the mainframe operation section 29a and write it in one of the job ticket storing areas for a remote operation apparatus (step S25).

When the image forming apparatus 3 has received a request for loading a job ticket, it reads out the job ticket to be subjected to the edition from the job ticket storing area for the mainframe operation section 29a, and writes it in one of the job ticket storing areas for a remote operation apparatus (step S26). At this time, the area in which the job ticket is written is an area having no job ticket written among the job ticket storing areas for a remote operation apparatus 33a to 33c.

Next, the image forming apparatus 3 issues identification information to transmit it to the remote operation apparatus 1 (step S27). In this description, identification information is information for identifying the job ticket to be subjected to the edition and the job ticket storing area for a remote operation apparatus to be accessed; for example, the year, month, and day when the request for edition is received, the time when the request for edition is received, the serial number of the one of the remote operation apparatus 1 to carry out the edition can be employed for the identification information. By the issuance of the identification information, it becomes possible to enable the edition of the job ticket for a remote operation apparatus as the object of edition by means of only the one of the remote operation apparatus 1 exclusively.

Next, the remote operation apparatus 1 transmits an instruction of edition to the image forming apparatus 3 together with the identification information (step S28). On the basis of the received identification information and the instruction of edition, the image forming apparatus 3 carries out the edition of the job ticket for a remote operation apparatus to be edited, and transmits the result of the edition to the remote operation apparatus 1 (step S29). Until the edition operation of the job ticket is completed (step S30:Y, step S31: Y), the operation from the step S28 to the step S31 is repeated; thus, the edition of the job ticket for a remote operation apparatus is carried out.

Next, when a request for saving a job ticket has been transmitted from the remote operation apparatus 1 to the image forming apparatus 3 (step S32), the image forming apparatus 3 writes the job ticket after edition in the job ticket storing area for the mainframe operation section 29*a*, to save the job ticket (step S33).

At this time, in the same way as the first embodiment, it is also appropriate to save the job ticket for a remote operation apparatus by substituting it for the job ticket for the mainframe operation section, or also it is possible to save it newly. Further, it is also appropriate that the job ticket for a remote operation apparatus is erased from the job ticket storing area for a remote operation apparatus; this makes the job ticket storing area ready for the next case where a request for edition of a job ticket is transmitted from any one of the remote operation apparatus 1.

Then, the issued identification information is erased (step S34), and the processing is completed. Besides, in the above-mentioned procedure, it is a matter of course that, in the same way as the step S7 shown in FIG. 4, the mainframe information may be transmitted to the remote operation apparatus 1 concerned at the time of edition.

On the other hand, in the step S24, on the basis of the job ticket storing area information transmitted from the image forming apparatus 3, if it is judged that there is no job ticket storing area for a remote operation apparatus in which a job ticket can be written (step S24: N), it is displayed on the display section 12 a message to the effect that edition of a job ticket is impossible (step S35), and the processing is completed.

According to the above-mentioned embodiment, in the step S27, identification information for identifying a job ticket to be subjected to edition is transmitted to the one of the remote operation apparatus 1 which has transmitted a request for edition; therefore, it is possible for the image forming apparatus 3 to identify which job ticket is to be edited by which remote operation apparatus 1. By this, edition of a job ticket can be carried out by a plurality of remote operation apparatus 1, which further improves the operational performance.

Further, if all the job ticket storing areas for a remote operation apparatus 33*a* to 33*c* are filled with a job ticket written each, which makes it impossible to edit a job ticket (step S24: N), a message to that effect is displayed (step S35); therefore, a user can find whether or not edition of a job ticket is possible.

Effect of the Invention

According to the invention having the feature set forth in (1), it is possible for a user to edit a job ticket from a remote operation apparatus without being influenced by the condition of an image forming apparatus, which improves the operational performance of the image forming system.

According to the invention having the feature set forth in (2), it is possible for a user to edit a job ticket from a remote operation apparatus without being influenced by the condition of an image forming apparatus, which improves the operational performance of the image forming system.

According to the invention having the feature set forth in (3), because a job ticket stored in a job ticket storing area for a remote operation apparatus can be edited only by a remote operation apparatus, it never happens that a remote operation apparatus competes with the mainframe operation section in an edition operation.

According to the invention having the feature set forth in (4), as occasion demands, it is possible to duplicate a job ticket to be edited by the mainframe operation section to make it a job ticket capable of being edited by a remote operation apparatus, or to substitute a job ticket which has been edited by a remote operation apparatus for a job ticket to be edited by the mainframe operation section.

According to the invention having the feature set forth in (5), it is possible to carry out edition of a job ticket by means of a plurality of remote operation apparatus, which improves the operational performance. Further, it is possible to write a job ticket to be subjected to edition in one of the job ticket storing areas for one of the remote operation apparatus, to make this job ticket capable of being edited only by said one of the remote operation apparatus.

According to the invention having the feature set forth in (6), identification information for identifying a job ticket to be subjected to edition is transmitted to one of the remote operation apparatus which has transmitted a request for edition; therefore, it is possible for the image forming apparatus to identify which job ticket is to be edited by which remote operation apparatus.

According to the invention having the feature set forth in (7), in a case where edition of a job ticket is impossible, the remote operation apparatus concerned is notified of that; therefore, a user can find whether or not edition of a job ticket is possible.

What is claimed is:

1. An image forming method comprising:
    storing a job ticket for specifying an output condition into a first job ticket storing area of a storage section equipped in an image forming apparatus, the output condition being specified for outputting image data onto an output medium;
    editing the job ticket stored in the first job ticket storing area by using an operation section equipped in the image forming apparatus;
    when a request for editing the job ticket is received from a remote operation apparatus connected to the image forming apparatus, reading out the job ticket from the first job ticket storing area and writing the read job ticket into a second job ticket storing area in the storage section, the second job ticket storing area being configured to store the job ticket capable of being edited only by the remote operation apparatus;

allowing the remote operation apparatus to exclusively edit the job ticket stored in the second job ticket storing area;

reading out, when a request for saving the job ticket is received from the remote operation apparatus, the job ticket edited by the remote operation apparatus from the second job ticket storing area and writing the read job ticket into the first job ticket storing area; and outputting the image data onto the output medium by applying the job ticket edited by using the operation section and/or by applying the job ticket edited by using the remote operation apparatus.

2. An image forming method for forming an image by using an image forming apparatus connected in communication with a plurality of remote operation apparatus for editing a job ticket specifying an output condition to output image data onto an output medium, the image forming apparatus comprising a storage section including a first job ticket storing area and a plurality of second job ticket storing areas, and the image forming method comprising:

storing the job ticket in the first job ticket storing area equipped in the image forming apparatus;

editing the job ticket stored in the first job ticket storing area by using an operation section equipped in the image forming apparatus;

when the image forming apparatus receives a request for editing the job ticket from one of the plurality of remote operation apparatus, reading the job ticket from the first job ticket storing area, and writing into one of the plurality of second job ticket storing areas; and allowing exclusively said one of the plurality of remote operation apparatus to edit the job ticket written into said one of the plurality of second job ticket storing areas.

3. The image forming method of claim 2, further comprising:

transmitting, when the image forming apparatus receives the request for editing the job ticket from said one of the plurality of remote operation apparatus, identification information to identify the job ticket being subjected to the requested editing by said one of the plurality of remote operation apparatus.

* * * * *